(12) United States Patent
Kim (10) Patent No.: US 6,999,247 B2
(45) Date of Patent: Feb. 14, 2006

(54) WIDE-ANGLE PROJECTION LENS

(75) Inventor: Jae-Bum Kim, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 10/998,842

(22) Filed: Nov. 29, 2004

(65) Prior Publication Data

US 2005/0117228 A1    Jun. 2, 2005

(30) Foreign Application Priority Data

Nov. 28, 2003  (KR) ................. 10-2003-0085491

(51) Int. Cl.
  *G02B 15/14*  (2006.01)
  *G02B 13/18*  (2006.01)
(52) U.S. Cl. ............... 359/793; 359/717; 359/691
(58) Field of Classification Search .......... 359/793, 359/784, 785, 779, 772, 773, 774, 775, 680, 359/681, 682, 689, 690, 686, 717, 691
See application file for complete search history.

(56) References Cited

U.S. PATENT DOCUMENTS 4,364,641 A * 12/1982 Mogami .............. 359/680

5,644,435 A  7/1997  Shikama ............. 359/691
5,973,848 A  10/1999 Taguchi et al. ......... 359/651

FOREIGN PATENT DOCUMENTS

| JP | 05-203871 A | 8/1993 |
| JP | 07-311338 A | 11/1995 |
| JP | 2003-15033 A | 1/2003 |
| JP | 2003-35870 A | 2/2003 |
| JP | 2003-156683 A | 5/2003 |

* cited by examiner

*Primary Examiner*—Timothy Thompson
(74) *Attorney, Agent, or Firm*—Gardner Carton & Douglas LLP (57) ABSTRACT

A wide-angle projection lens includes, in order from an object side: a first lens group including four lenses and having a negative refractive power; and a second lens group including a cemented lens and having a positive refractive power. The first lens group includes an aspherical lens and a spherical lens having a positive refractive power. The wide-angle projection lens further includes an iris diaphragm located after the first lens of the second lens group from the object side, and satisfies the following conditional expressions fb/f>3, $-2.0<D_{12}/f_1<-1.3$, and $0.8<Lr/Lf<1.2$ where f denotes the focal length of the projection lens; fb denotes the retrofocal length of the projection lens; $f_1$ denotes the focal length of the first lens group; Lf denotes the thickness of the first lens group; Lr denotes the thickness of the second lens group; and $D_{12}$ denotes the distance between the first and second lens groups.

18 Claims, 6 Drawing Sheets

WIDE-ANGLE PROJECTION LENS

CROSS REFERENCE TO RELATED APPLICATION

This application claims priority to and the benefit of Korean Patent Application No. 10-2003-85491 filed on Nov. 28, 2003 in the Korean Intellectual Property Office, the entire content of which is incorporated herein by reference.

BACKGROUND OF THE INVENTION (a) Field of the Invention

The present invention relates to a projection lens. More specifically, the present invention relates to a wide-angle projection lens for a projection display.

(b) Description of the Related Art

Recent trends in display device technology have included ultraminiaturization and high precision of unit components as well as the increasing size of displays. Display devices have been making steady progress towards higher quality images on larger screens. Two examples of display devices are the projection display and the flat panel display. Typically, a projection display has a larger set thickness with a lesser image quality relative to a flat panel display. Hence, there is an impetus to improve the technological characteristics of the projection display. To minimize the thickness of the projection TV or monitor, a wide angle of view according to a short projection distance is an essential requirement of the projection lens for projection display.

The projection display is a system that irradiates energy of a defined light distribution formed through a lighting system on a display panel, and enlarges the image of the display panel through a projection lens. In the projection display, the brightness of the projection lens and the central and peripheral illuminance ratio have a direct effect on the brightness and the illuminance of the TV or monitor. Therefore, the projection lens is required to have a low F-number and a high level of peripheral light.

Previous projection lenses developed to satisfy the aforementioned requirements include those disclosed in Japanese Patent Laid-open Publication No. 1993-203871, Japanese Patent Laid-open Publication No. 1995-311338, Japanese Patent Laid-open Publication No. 2003-15033, Japanese Patent Laid-open Publication No. 2003-35870, Japanese Patent Laid-open Publication No. 2003-156683, U.S. Pat. No. 5,973,848, and U.S. Pat. No. 5,644,435.

The projection lens of the Japanese Patent Laid-open Publication No. 1993-203871 merely contributes to simplification of the structure. Japanese Patent Laid-open Publication No. 1995-311338 provides a more enhanced optical performance with a somewhat complex structure. However, the projection lens of Japanese Patent Laid-open Publication No. 1995-311338 does not include any means for satisfying more recent requirements for high resolution or reducing the thickness of the TV.

The projection lenses of Japanese Patent Laid-open Publication No. 2003-15033 and Japanese Patent Laid-open Publication No. 2003-35870 suggest a structure for reducing the thickness of the TV or monitor without maintaining the rotation symmetry of the optical system, and they are disadvantageous in regards to the complex structure with respect to the reduced thickness of the optical system, a steep increase of assembling sensitivity, deterioration of the design performance, and a rise of the production cost. Due to these detrimental aspects, the expected products are evaluated to be of an extremely low usefulness.

Compared with the aforementioned technologies, the projection lens of Japanese Patent Laid-open Publication No. 2003-156683 suggests a structure capable of opticalization, but it is difficult for it to achieve an adequate correction of chromatic aberration as required for projection display, causing color blurring.

The projection lens disclosed in the U.S. Pat. No. 5,973,848 includes a first lens group having a negative refractive power, and second and third lens groups having a positive refractive power, with the first lens group and the third lens group having an aspherical lens. The projection lens of U.S. Pat. No. 5,644,435 includes a first lens group having a negative refractive power, and a second lens group having a negative refractive power. The projection lenses of the both these patents cannot achieve an adequate correction of chromatic aberration.

The size and performance of a projection lens is greatly dependent upon characteristics such as the size of an enlarged image (i.e., panel size), the brightness of the lens, and the zoom factor. In consideration of a panel size of 0.5" to 1", the size of the lens on the screen side is generally around 50 mm to 100 mm, causing an escalation in the price. The projection lens is configured as a retrofocus-type optical system so as to secure a long retrofocal length and realize its miniaturization. The retrofocus optical system generally includes a first lens group having a negative refractive power and a second lens group having a positive refractive power. The negative refractive power of the first lens group is extremely high when a wide angle of view and a long retrofocal length are required. A drop in the negative refractive power causes an increase in distortion and chromatic aberration, both of which are difficult to correct. A conventional method for correcting distortion and chromatic aberration involves increasing the number of lenses in the first lens group and arranging a convex lens having a positive refractive power in the first lens group. Another method uses an aspherical lens for the first lens group to correct distortion while minimizing the increment of the number of lenses.

However, these methods involve an increase in the number of lenses and the use of an aspheric surface for the lenses so as to secure a long retrofocal length and a wide angle of view, increasing the size and hence the weight of the optical system and causing a rise of the production cost due to the increased weight and aperture.

The limitation in increasing the number of lenses causes an obstruction to an adequate correction of aberrations. In case of using an aspherical lens, distortion can be easily corrected, but chromatic aberration is hard to correct.

In addition, a ghost or an internal reflection may cause great deterioration of image quality and contrast for a projection TV, and the characteristics of display panels must be taken into consideration in designing the optical system for such a projection TV. Particularly, when the light incident upon the panel from the lighting system is reflected from the panel and enters the projection lens in the reflection panel such as a DMD (Digital Micromirror Display), the light re-reflected from the surface of the projection lens re-enters the panel to cause a deterioration of image quality in the whole or in a specific part of the screen. Therefore, there is a demand for minimizing the reflected light in a design of the projection lens.

SUMMARY OF THE INVENTION

The present invention provides a wide-angle projection lens that secures a long retrofocal length and a wide angle of view with ease of aberration correction, and contributes to cost saving and miniaturization of the optical system.

The present invention also provides a projection lens that has a proper lens profile and lens arrangement for refractive power to avoid as much reflection of incident light of a lighting system as possible.

In one aspect of the present invention, there is provided a wide-angle projection lens that includes, in order from an object side: a first lens group that includes four lenses and has a negative refractive power; and a second lens group that includes at least one cemented lens and has a positive refractive power. The first lens group includes at least one aspherical lens, and at least one spherical lens having a positive refractive power. The wide-angle projection lens further includes an iris diaphragm located after the first lens of the second lens group from the object side, and satisfies the following conditional expressions:

$$fb/f>3,$$

$$-2.0<D_{12}/f_1<-1.3, \text{ and}$$

$$0.8<Lr/Lf<1.2$$

where f denotes the focal length of the projection lens; fb denotes the retrofocal length of the projection lens; $f_1$ denotes the focal length of the first lens group; $f_2$ denotes the focal length of the second lens group; Lf denotes the thickness of the first lens group; Lr denotes the thickness of the second lens group; and $D_{12}$ denotes the distance between the first and second lens groups.

The wide-angle projection lens further satisfies the following conditional expression:

$$1.5<AV\_Ndf<1.6$$

where AV_Ndf denotes the averaged refractive index of lenses having a negative refractive power in the first lens group, or $$-5.5<f_1/f<-3.5$$

In another aspect of the present invention, there is provided a wide-angle projection lens that includes, in order from an object side, a first lens group that includes four lenses and has a negative refractive power and a second lens group that includes at least one cemented lens and has a positive refractive power. The first lens group includes at least one aspherical lens, and at least one spherical lens having a positive refractive power. The wide-angle projection lens further includes an iris diaphragm located after the first lens of the second lens group from the object side, and satisfies the following conditional expressions:

$$-0.1<(G_9R_1+G_9R_2)/(G_9R_1-G_9R_2)<0.4, \text{ and}$$

$$-1.0<(G_{10}R_1+G_{10}R_2)/(G_{10}R_1-G_{10}R_2)<-0.25$$

where $G_8$ denotes the third lens counted from an image side; $G_9$ denotes the second lens counted from the image side; $G_{10}$ denotes the first lens counted from the image side; $R_1$ denotes the radius of curvature of an object side surface of each lens; and $R_2$ denotes the radius of curvature of an image side surface of each lens.

The wide-angle projection lens further satisfies the following conditional expression:

$$|L_8/(G_9R_2)|>0.35$$

where $L_8$ denotes the distance between the image side surface of the third lens counted from the image side and an image plane, $$-1.3<f_2/f_1<-0.9, \text{ or}$$

$$35<Vd_9-Vd_{10}<58$$

where $Vd_9$ denotes the variance of the second lens counted from the image side; and $Vd_{10}$ denotes the variance of the first lens counted from the image side.

In the wide-angle projection lenses, a mirror is located between the first and second lens groups to change the path of light passing through the first lens group.

In still another aspect of the present invention, there is provided a wide-angle projection lens that includes, in order from an object side: a first lens group having a negative refractive power and a second lens group having a positive refractive power. The first lens group includes, in order from the object side, a first lens having a negative refractive power, a second lens group having a negative refractive power, a third lens having a negative refractive power, and a fourth lens having a positive refractive power. At least one of the four lenses is an aspherical lens. The second lens group includes at least one cemented lens. The wide-angle projection lens further includes an iris diaphragm located between the first and second lenses of the second lens group, as numbered from the object side.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE EXEMPLARY EMBODIMENTS

In the following detailed description, exemplary embodiments of the invention have been shown and described. As will be realized, the invention is capable of modification in various respects, all without departing from the invention. Accordingly, the drawings and description are to be regarded as illustrative in nature, and not restrictive.

Figure 1:
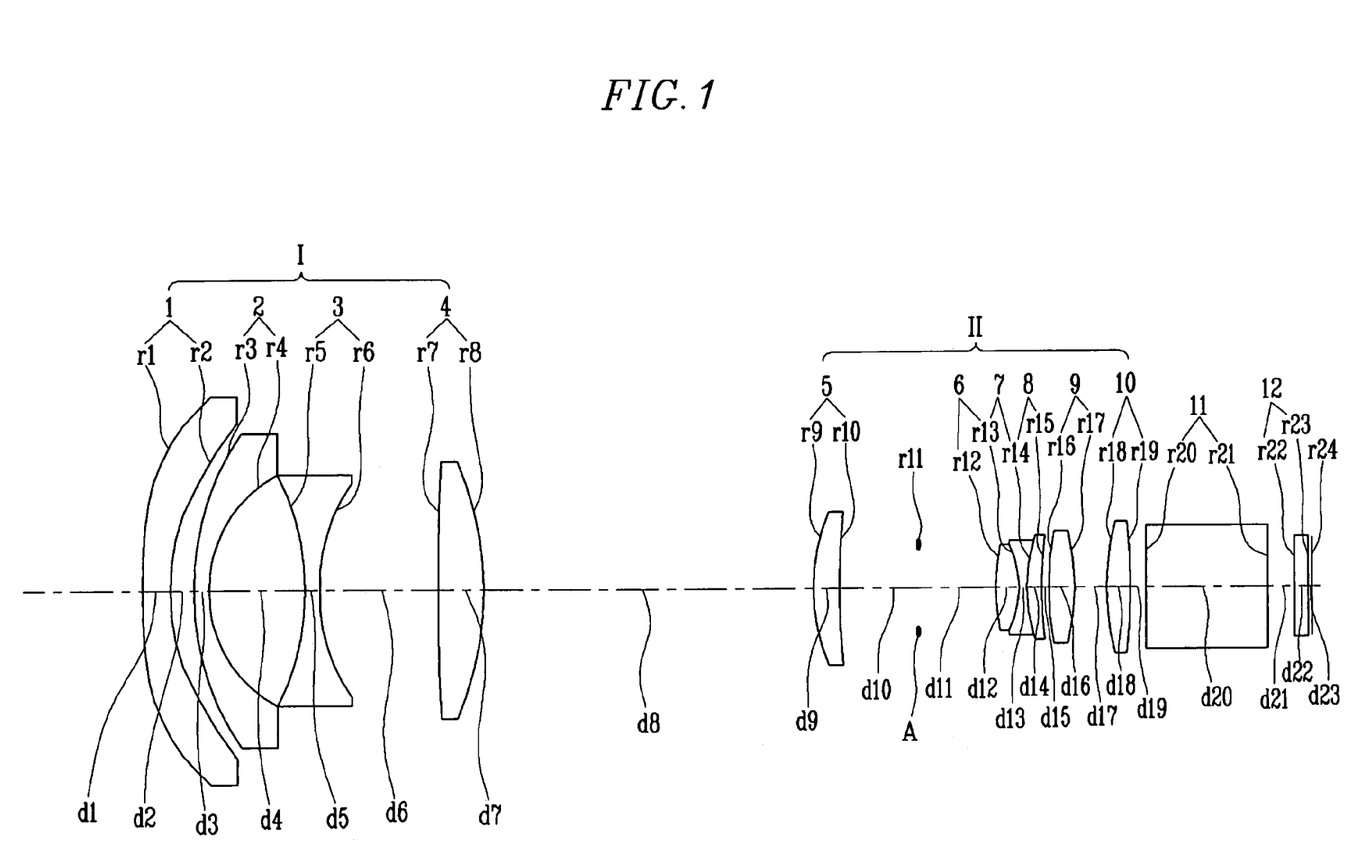
FIG. 1 shows the structure of a wide-angle projection lens according to a first embodiment of the present invention.
Figure 3:
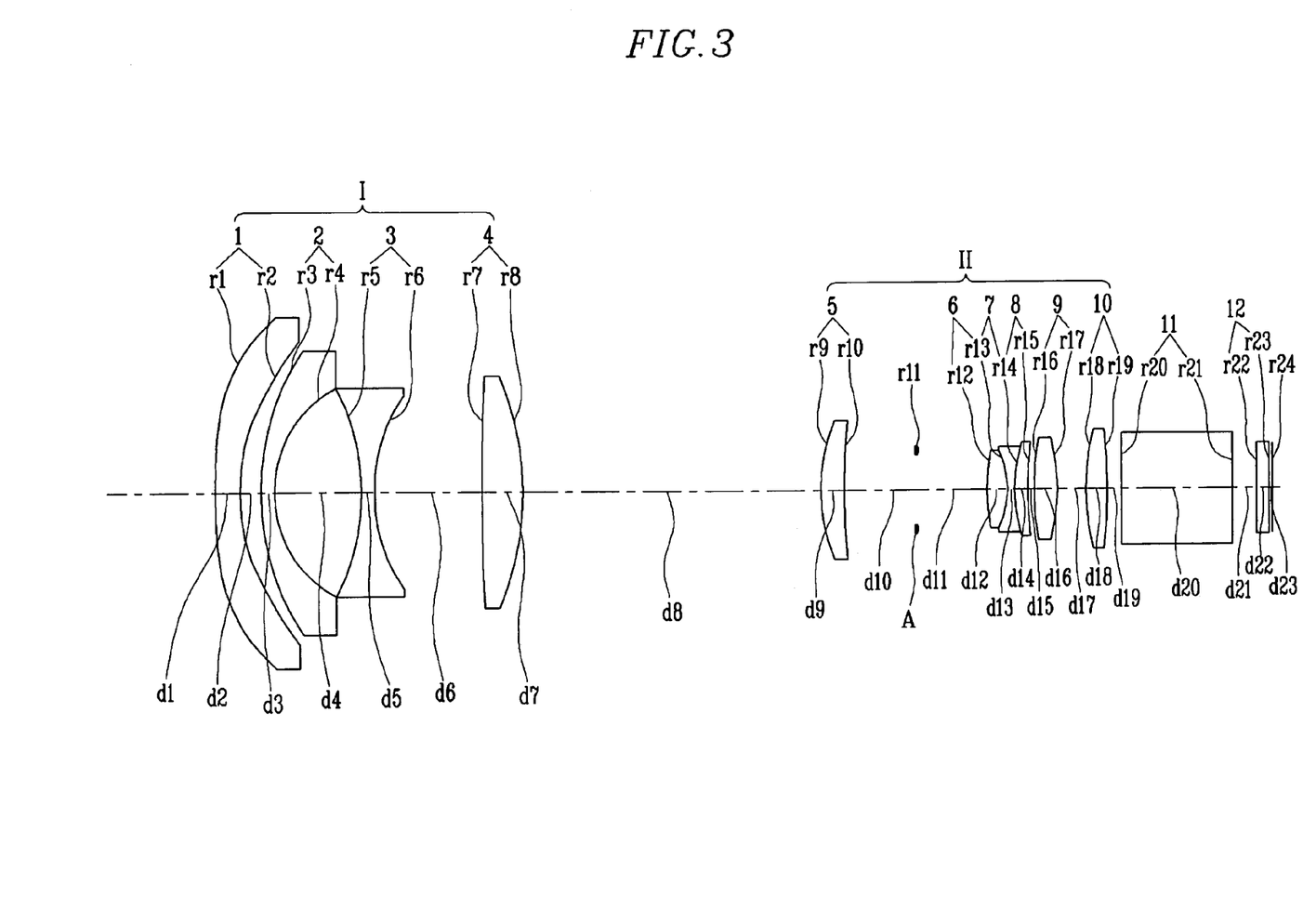
FIG. 3 shows the structure of a wide-angle projection lens according to a second embodiment of the present invention.

FIGS. 1 and 3 show the structure of a wide-angle projection lens according to each embodiment of the present invention by zoom position.

As shown in FIGS. 1 and 3, the wide-angle projection lens according to an embodiment of the present invention includes, in order from an object side, a first lens group I having a negative refractive power and a second lens group II having a positive refractive power. A mirror (not shown) for changing an optical path may also be provided between the first and second lens groups I and II.

The first lens group I includes at least one aspherical lens and at least one spherical lens. An iris diaphragm A is located after the first lens of the second lens group II.

The number and the profile of component lenses in each lens group are different from embodiment to embodiment, and the specific configuration of each lens group is described below by way of explanation of the embodiments. The term "object side" as used herein refers to a screen side on which an image to be projected through a projection lens is displayed.

Hereinafter, the functions of the above-constructed wide-angle projection lens according to an embodiment of the present invention will be described.

The projection lens according to an embodiment of the present invention is a lens for a projection display that includes a light source, a lighting system, and a reflection panel. The lens is a rear projection lens that magnifies and projects an image formed on the panel including a plurality of reflection mirrors to display an image of high quality on a large screen.

In the embodiment of the present invention, the projection lens includes, from the object side, the first lens group I having a negative refractive power and a second lens group II having a positive refractive power. The first lens group I includes at least one aspherical lens so that the lenses of the first lens group are arranged in a proper size.

More specifically, the control of distortion and color blurring is an important factor in the design of an optical system such as a projection TV or monitor. The display distortion occurring on an image displayed through a 4:3 or 16:9 rectangular frame causes a deterioration of the quality of a display product, so in general it is controlled to about 1%. In the embodiment of the present invention, however, the display distortion is controlled to be less than about 0.2% so as to realize an optical system making a distortion-free image on a greater than 70" wide screen. For this purpose, aspherical lenses are used for the first lens group I and are particularly arranged at proper positions with a proper profile. Namely, the first lens of the first lens group, which is largest in size and closest to the object side, possesses an aspheric surface. As the first lens that is a large aperture having a weak refractive power has an aspheric surface, field-specific light beam separation occurs to make the best use of the aspheric surface effect, thereby facilitating a correction of distortion.

In addition, the first lens group I includes one lens having a positive refractive power to minimize a magnification chromatic aberration in a wide wavelength range, reduce a color blurring on a still image, and prevent a rise of the production cost. The second lens group II includes a cemented lens (e.g., a doublet lens or a triplet lens) to minimize a magnification chromatic aberration occurring from the image beam.

To make a high-resolution image in such a retrofocus type of optical system as the embodiment of the present invention, the assembly performance of the retro-group, i.e., the second lens group II, must be stable. Particularly, construction that maintains the optical axis of each lens of the second lens group enhances the performance stability of the projection lens and the production yield in the production on a large scale. For this purpose, it is necessary to maintain the stability of the assembly optical axis by providing a contact of the lens edges or a cemented configuration. Hence, the second lens group II includes a cemented lens such as a doublet lens or a triplet lens to guarantee performance stability in the embodiment of the present invention.

On the other hand, the projection display needs an optical component for changing an optical path of an incident light of a lighting system from a panel to the projection lens. The optical component is located between the projection lens and the lighting system, so the projection lens is required to have a sufficiently long retrofocal length. Accordingly, the embodiment of the present invention secures a focal length at least three times as long as the focal length of the projection lens.

To achieve stable performance in the projection lens for a projection display, the front group, i.e., the first lens group, may include at least five lenses, in which case the use of a large number of lenses having a large diameter leads to an abrupt rise of the cost. By contrast, when the first lens group includes three lenses or less, the magnification chromatic aberration increases, causing color blurring on the image. It is also difficult to meet a reasonable production price and a stable performance in the projection lens having an HD-level high resolution and a high projection ratio. Accordingly, the embodiment of the present invention arranges four lenses in the first lens group I and uses a material having a low refractive index for the lenses, so as to realize a high performance such as HD-level high resolution at a low production cost.

The wide-angle projection lens according to an embodiment of the present invention satisfies the following conditional expressions:

$fb/f > 3$ [Conditional Expression 1]

$-2.0 < D_{12}/f_1 < -1.3$ [Conditional Expression 2]

$0.8 < Lr/Lf < 1.2$ [Conditional Expression 3]

where f denotes the focal length of the projection lens; fb denotes the retrofocal length of the projection lens; $f_1$ denotes the focal length of the first lens group I; $f_2$ denotes the focal length of the second lens group II; Lf denotes the thickness of the first lens group I; Lr denotes the thickness of the second lens group II; and $D_{12}$ denotes the distance between the first and second lens groups I and II.

Conditional Expression 1 defines a condition for securing a long retrofocal length. When Expression 1 is not satisfied, there is little or no space for insertion of optical components connecting the projection lens and the lighting system.

Conditional Expression 2 defines a proper distance between the first and second lens groups I and II. In a projection display, a mirror for changing an optical path must be located between the first and second lens groups I and II so as to minimize the size of the optical system. For this purpose, it is necessary to provide a proper power arrangement in the first and second lens groups I and II and maintain an adequate distance between the first and second lens groups I and II for mechanism configuration.

When the value exceeds the upper limit of Expression 2, there is no space for a mirror between the first and second lens groups I and II for the purpose of changing an optical path. In addition, the configuration satisfying Expression 1 cannot be implemented with a low power of the first lens group I. In contrast, when the value falls below the lower limit of Expression 2, the power of the first lens group I abnormally increases to cause an increase in the magnification chromatic aberration.

Conditional Expression 3 is for miniaturization of the optical system. When the value exceeds the upper limit of Expression 3, the chromatic aberration and the curvature of image are increased. In contrast, when the value falls below the lower limit of Expression 3, the thickness of the first lens group is increased. As a result, the size of the component lenses of the first lens group I is increased, thereby raising the production cost and increasing the size of the optical system, leading to difficulty in miniaturization of the optical system.

The wide-angle projection lens according to an embodiment of the present invention also satisfies the following conditional expression:

$$1.5 < AV\_Ndf < 1.6 \qquad \text{[Conditional Expression 4]}$$

where AV_Ndf denotes the averaged refractive index of lenses having a negative refractive power in the first lens group I.

Conditional Expression 4 defines an adequate material for the lenses having a negative refractive power used for the first lens group I so as to achieve a required optical performance at a low production cost.

When the value falls below the lower limit of Expression 4, the aberration characteristic deteriorates to cause a deterioration of the optical performance. In contrast, when the value exceeds the upper limit of Expression 4, the expense for the lens material increases to cause an escalation of the product price.

The wide-angle projection lens according to an embodiment of the present invention also satisfies the following conditional expression:

$$-5.5 < f_1/f < -3.5 \qquad \text{[Conditional Expression 5]}$$

Conditional Expression 5 defines the ratio of the focal length of the first lens group I to the focal length of the projection lens. When the ratio exceeds the upper limit of Expression 5, the refractive power of the first lens group I increases, causing an increase in the magnification chromatic aberration. In contrast, when the ratio falls below the lower limit of Expression 5, it becomes difficult to implement a configuration satisfying Expression 1 and to secure a wide angle of view.

According to these conditions, the embodiment of the present invention provides a high-resolution projection lens that has a magnification chromatic aberration less than 0.7-fold of the unit pixel size of the panel in the wide wavelength range of 440 to 640 nm and a distortion of less than 0.2% in the whole screen area, with a peripheral light amount ratio of more than 85%.

In the reflection panel of a projection display, such as a DMD panel, in which the reflection angle of light through a tilt of each pixel constituting the panel forms an image, the image formed from the reflected images of the panel does not pass through the projection lens with one hundred percent transmission but re-enters the panel via reflection from the lens face to form a ghost or a flare image on the screen. This causes a significant degradation of the image quality and an abrupt deterioration of the contrast of the image. Hence, this must be taken into consideration in designing the projection lens for protection against a ghost or an internal reflection.

For this purpose, the projection lens according to an embodiment of the present invention includes first and second lens groups I and II as stated above and satisfies the following conditional expressions:

$$-0.1 < (G_9R_1+G_9R_2)/(G_9R_1-G_9R_2) < 0.4, \qquad \text{[Conditional Expression 6]}$$

$$-1.0 < (G_{10}R_1+G_{10}R_2)/(G_{10}R_1-G_{10}R_2) < -0.25, \text{ and} \qquad \text{[Conditional Expression 7]}$$

$$|L_8/(G_8R_2)| > 0.35 \qquad \text{[Conditional Expression 8]}$$

where $G_8$ denotes the lens coming eighth in position from the object side (hereinafter, referred to as "eighth lens"); $G_9$ denotes the lens coming ninth in position from the object side (hereinafter, referred to as "ninth lens"); $G_{10}$ denotes the lens coming tenth in position from the object side (hereinafter, referred to as "tenth lens"); $R_1$ denotes the radius of curvature of an object side surface of each lens; $R_2$ denotes the radius of curvature of an image side surface of each lens; and $L_8$ denotes the distance between the image side surface of the eighth lens counted from the image side and an image plane.

When Conditional Expressions 6, 7, and 8 are not satisfied, a ghost occurs, deteriorating the image quality in the case of a DMD panel that forms an image by a geometric tilt of pixels.

On the other hand, a ghost image generated in the projection display as described above is affected by the refractive power and the lens profile of the retro-group close to the panel, i.e., the second lens group II. The light emitted from the second lens group II enters the panel in a nearly telecentric manner, so the second lens group II must not be larger in lens size than the effective size of the panel and must not be larger in refractive angle of the light beam than the first lens group I. For this reason, the reflected image from the surface of the second lens group II is greatly dependent upon the lens profile and the refractive power of the second lens group II in regard to the ghost image. In particular, the profile and the refractive power of two or three lenses of the second lens group II close to the panel have a direct effect on the ghost of the screen.

To obtain a ghost-free or ghost-reduced image, the profiles of the lenses are directly controlled according to Expressions 6 and 7 in the embodiment of the present invention. When the panel side surface (i.e., the image side surface) of the lens (e.g., the tenth lens) of the second lens group II closest to the panel has a convex profile and the power (i.e., the radius of curvature) of the concave lens surface does not satisfy Expressions 6 and 7, the reflected image from each lens surface of the two or three lenses (e.g., the eighth, ninth and tenth lenses) of the second lens group II close to the panel is recreated on the screen of the panel to produce a double image or a ghost image.

In consideration of this, the wide-angle projection lens according to an embodiment of the present invention satisfies the following conditional expression.

$$-1.3 < f_2/f_1 < -0.9 \qquad \text{[Conditional Expression 9]}$$

When the ratio exceeds the upper limit of Conditional Expression 9, it becomes difficult to implement a projection lens having a wide angle of view and a configuration satisfying Expression 1 due to the power of the first lens group I. Contrarily, when the ratio falls below the lower limit of Expression 9, the curvature of image and stigmatism are increased.

In the projection lens according to the embodiment of the present invention having the above characteristics, the difference in variance between the two lenses (e.g., the tenth and ninth lenses) closest to the image side has a great effect on the magnification chromatic aberration at the g-line or F-line. When the lens (i.e., the tenth lens) closest to the image side has telecentricity, the weak negative refractive power of the second lens group II makes it impossible to control the magnification chromatic aberration in the ordinary ray as desired.

Accordingly, the projection lens according to an embodiment of the present invention satisfies the following conditional expression.

$$35 < Vd_9 - Vd_{10} < 58 \quad \text{[Conditional Expression 10]}$$

where $Vd_9$ denotes the variance of the lens (i.e., the ninth lens) coming second in position from the image side; and $Vd_{10}$ denotes the variance of the lens (i.e., the tenth lens) closest to the image side.

Conditional Expression 10 is for properly controlling the variances of the two lenses closest to the image side to minimize the magnification chromatic aberration in the whole image region (especially, the magnification chromatic aberration in the short wavelength region).

When the value falls below the lower limit of Expression 10, the magnification chromatic aberration in the short wavelength, region increases. Contrarily, when the value exceeds the upper limit of Expression 10, it becomes difficult to correct the magnification chromatic aberration by using an optical glass.

The embodied values of the wide-angle projection lenses according to the embodiments of the present invention that satisfy the above conditions (Expressions 1 to 10) are given as follows.

In the description, "f" is the focal length, "ri (where i=24 to 25)" is the radius of curvature of a refractive surface, "di (where i=1 to 24 or 25)" is the thickness of a lens or the distance between lenses, "nd" is the refractive index, and "vd" is the variance. Here, the unit of length is "mm (millimeter)".

FIG. 1 shows the structure of a wide-angle projection lens according to a first embodiment of the present invention.

The wide-angle projection lens according to the first embodiment of the present invention includes, as illustrated in FIG. 1, first and second lens groups I and II. The first lens group I includes first and second lenses 1 and 2 each having a negative refractive power and a convex meniscus surface facing the object side, a third lens 3 having a negative refractive power and a concave surface on either side thereof, and a fourth lens 4 having a positive refractive power and a convex surface facing the image side. The first lens 1 has an aspherical surface on both sides thereof.

The second lens group II includes a fifth lens 5 having a positive refractive power and a convex surface facing the object side, a sixth lens 6 having a positive refractive power and a convex surface on either side thereof, a seventh lens 7 having a negative refractive power and a concave surface on either side thereof, an eighth lens 8 having a positive refractive power and a convex meniscus surface facing the object side, and ninth and tenth lenses 9 and 10 each having a positive refractive power and a convex surface on either side thereof. The sixth, seventh, and eighth lenses 6, 7, and 8 are combined together into one cemented lens (i.e., a triplet lens).

In addition to these lenses, the wide-angle projection lens further includes optical components 11 and 12, which may be included in the second lens group II or not. In this embodiment, the optical components 11 and 12 optionally include a total reflection prism, a mirror, a cover glass, etc.

Various values associated with the component lenses of the wide-angle projection lens according to the first embodiment of the present invention are presented in Table 1.

TABLE 1

| Face Number | Radius of Curvature (r) | Thickness, Distance (d) | Refractive Index (nd) | Variance (vd) |
|---|---|---|---|---|
| *1 | 159.84227 | 6.411697 | 1.492000 | 57.1000 |
| *2 | 46.15723 | 5.850637 | | |
| 3 | 66.50050 | 3.000000 | 1.516798 | 64.1983 |
| 4 | 28.28363 | 18.648015 | | |
| 5 | −49.98493 | 3.000000 | 1.658436 | 50.8546 |
| 6 | 44.53424 | 20.088719 | | |
| 7 | 626.80628 | 9.510000 | 1.698945 | 30.0506 |
| 8 | −62.13745 | 79.178183 | | |
| 9 | 40.67924 | 5.761268 | 1.670028 | 47.1965 |
| 10 | 851.23843 | 18.507094 | | |
| 11 | ∞ | 6.133679 | | |
| 12 | 61.40440 | 4.646882 | 1.487489 | 70.4412 |
| 13 | −24.04973 | 1.400000 | 1.755199 | 27.5302 |
| 14 | 23.53249 | 4.183435 | 1.516798 | 64.1983 |
| 15 | 120.48193 | 3.740417 | | |
| 16 | 120.01395 | 5.100000 | 1.487489 | 70.4412 |
| 17 | −61.01918 | 10.009065 | | |
| 18 | 44.56973 | 5.541293 | 1.805181 | 25.4564 |
| 19 | −158.56254 | 0.100000 | | |
| 20 | ∞ | 25.000000 | | |
| 21 | ∞ | 5.300000 | | |
| 22 | ∞ | 2.743200 | | |
| 23 | ∞ | 0.725241 | | |
| 24 | Image side | −0.025317 | | |

The symbol "*" indicates an aspheric surface.

coefficients can be expressed by the following equation:

$$x = \frac{c^2 y^2}{1 + \sqrt{1 - (K+1)c^2 y^2}} + Ay^2 + By^2 + Cy^2 + Dy^2 \quad \text{[Equation 1]}$$

where x is the distance along the optical axis from the vertex of the lens; y is the distance in the direction vertical to the optical axis; c is the inverse (1/R) of the radius of curvature on the vertex of the lens; K is the conical constant; and A, B, C, and D are aspheric surface coefficients.

The aspheric surface coefficients according to the first embodiment of the present invention as determined by the Equation 1 are presented in Table 2. In the first embodiment, the first lens 1 has an aspheric surface on either side thereof.

TABLE 2

| | Aspheric Surface Coefficients of First Face | Aspheric Surface Coefficients of Second Face |
|---|---|---|
| K | 0.758245 | 0.000000 |
| A | 0.454812E−05 | 0.115816E−05 |
| B | −0.152314E−08 | 0.105075E−08 |
| C | 0.477074E−12 | −0.486415E−11 |
| D | −0.320690E−16 | 0.142269E−14 |

Figure 2:
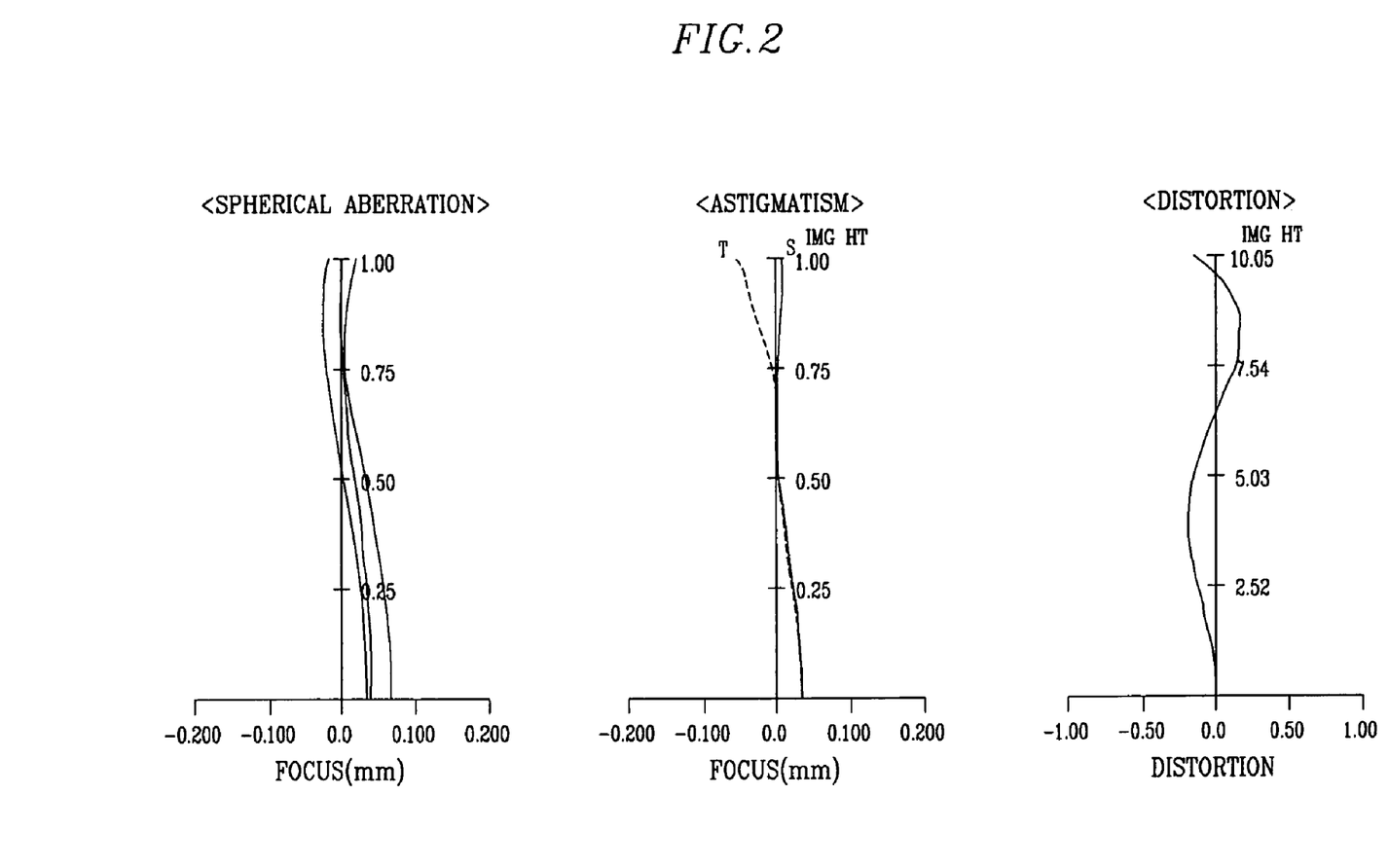
FIG. 2 shows characteristic curves of aberrations of the wide-angle projection lens according to the first embodiment of the present invention.

FIG. 2 shows the characteristic curves of spherical aberration, astigmatism, and distortion of the wide-angle projection lens according to the first embodiment of the present invention.

FIG. 3 shows the structure of a wide-angle projection lens according to a second embodiment of the present invention. The wide-angle projection lens according to the second embodiment of the present invention has the same structure of the wide-angle projection lens according to the first embodiment, as illustrated in FIG. 3.

Various values associated with the component lenses of the wide-angle projection lens according to the second embodiment of the present invention are presented in Table 3.

TABLE 3

| Face Number | Radius of Curvature (r) | Thickness, Distance (d) | Refractive Index (nd) | Variance (vd) |
|---|---|---|---|---|
| *1 | 162.37222 | 5.500000 | 1.492000 | 57.1000 |
| *2 | 43.74539 | 4.463945 | | |
| 3 | 57.22918 | 3.000000 | 1.589000 | 61.3000 |
| 4 | 26.92336 | 19.648463 | | |
| 5 | −54.06331 | 3.000000 | 1.658000 | 50.5000 |
| 6 | 40.79007 | 25.327153 | | |
| 7 | 771.33870 | 9.510000 | 1.658000 | 50.5000 |
| 8 | −59.13882 | 68.000000 | | |
| 9 | 37.67740 | 4.735950 | 1.684712 | 30.7818 |
| 10 | 128.84415 | 14.599395 | | |
| 11 | ∞ | 14.633418 | | |
| 12 | 56.11290 | 4.569562 | 1.497000 | 81.6000 |
| 13 | −21.62917 | 1.400000 | 1.801169 | 26.0079 |
| 14 | 26.33350 | 3.376373 | 1.523091 | 66.4687 |
| 15 | 120.48193 | 1.300000 | | |
| 16 | 67.77429 | 5.100000 | 1.487000 | 70.4000 |
| 17 | −50.13039 | 4.024609 | | |
| 18 | 52.63158 | 4.569076 | 1.805000 | 25.5000 |
| 19 | −95.64806 | 3.000000 | | |
| 20 | ∞ | 25.000000 | | |
| 21 | ∞ | 5.300000 | | |
| 22 | ∞ | 2.743200 | | |
| 23 | ∞ | 0.732921 | | |
| 24 | Image side | −0.033000 | | |

The symbol "*" indicates an aspheric surface. The aspheric surface coefficients are presented in Table 4. In the second embodiment, the first lens 1 has an aspheric surface on either side thereof.

TABLE 4

| | Aspheric Surface Coefficients of First Face | Aspheric Surface Coefficients of Second Face |
|---|---|---|
| K | 11.535662 | 0.000000 |
| A | 0.488572E−05 | 0.753179E−06 |
| B | −0.202333E−08 | 0.157433E−08 |
| C | 0.775047E−12 | −0.483920E−11 |
| D | −0.951297E−16 | 0.117385E−14 |

Figure 4:
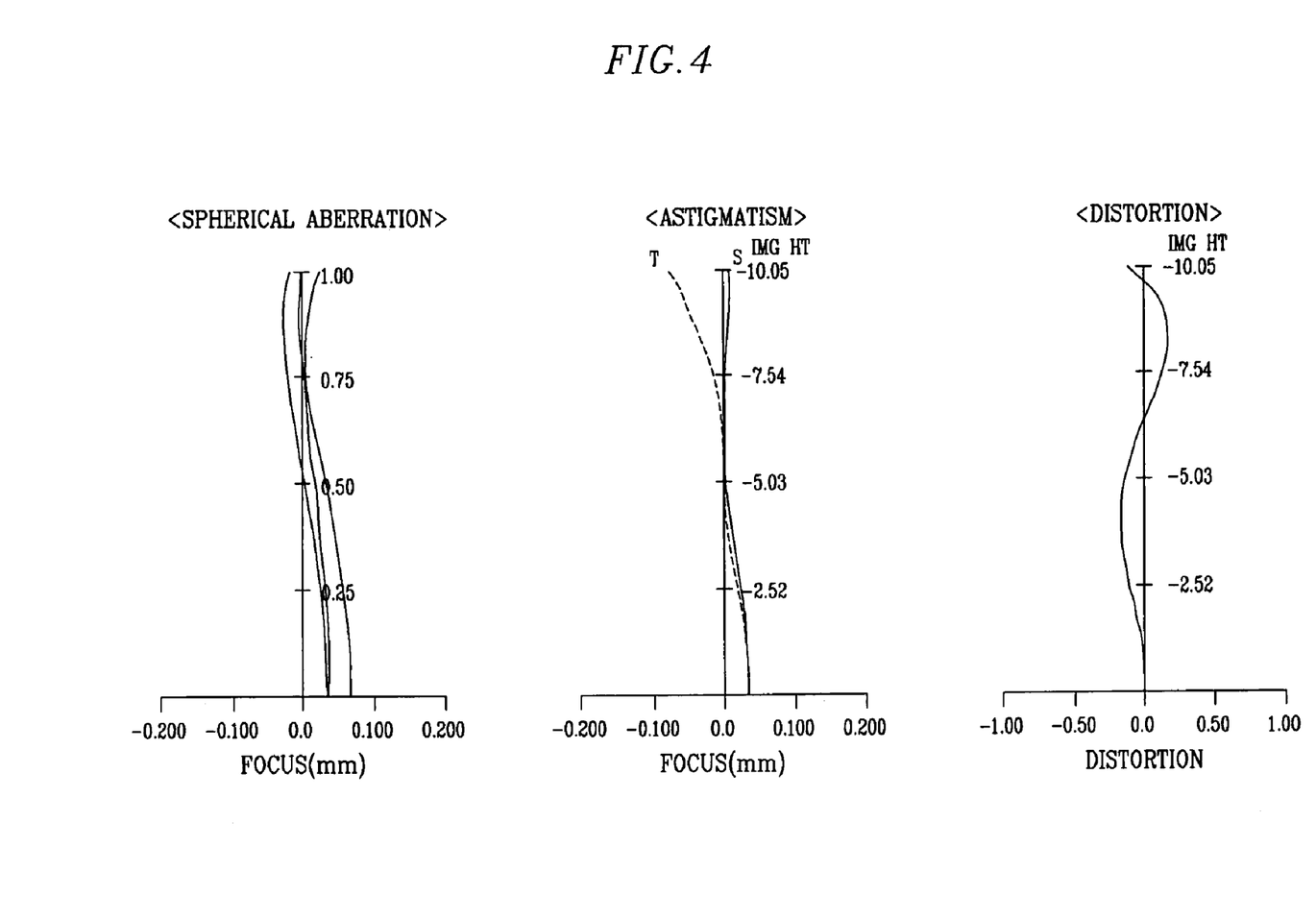
FIG. 4 shows characteristic curves of aberrations of the wide-angle projection lens according to the second embodiment of the present invention.

FIG. 4 shows the characteristic curves of spherical aberration, astigmatism, and distortion of the wide-angle projection lens according to the second embodiment of the present invention.

Figure 5:
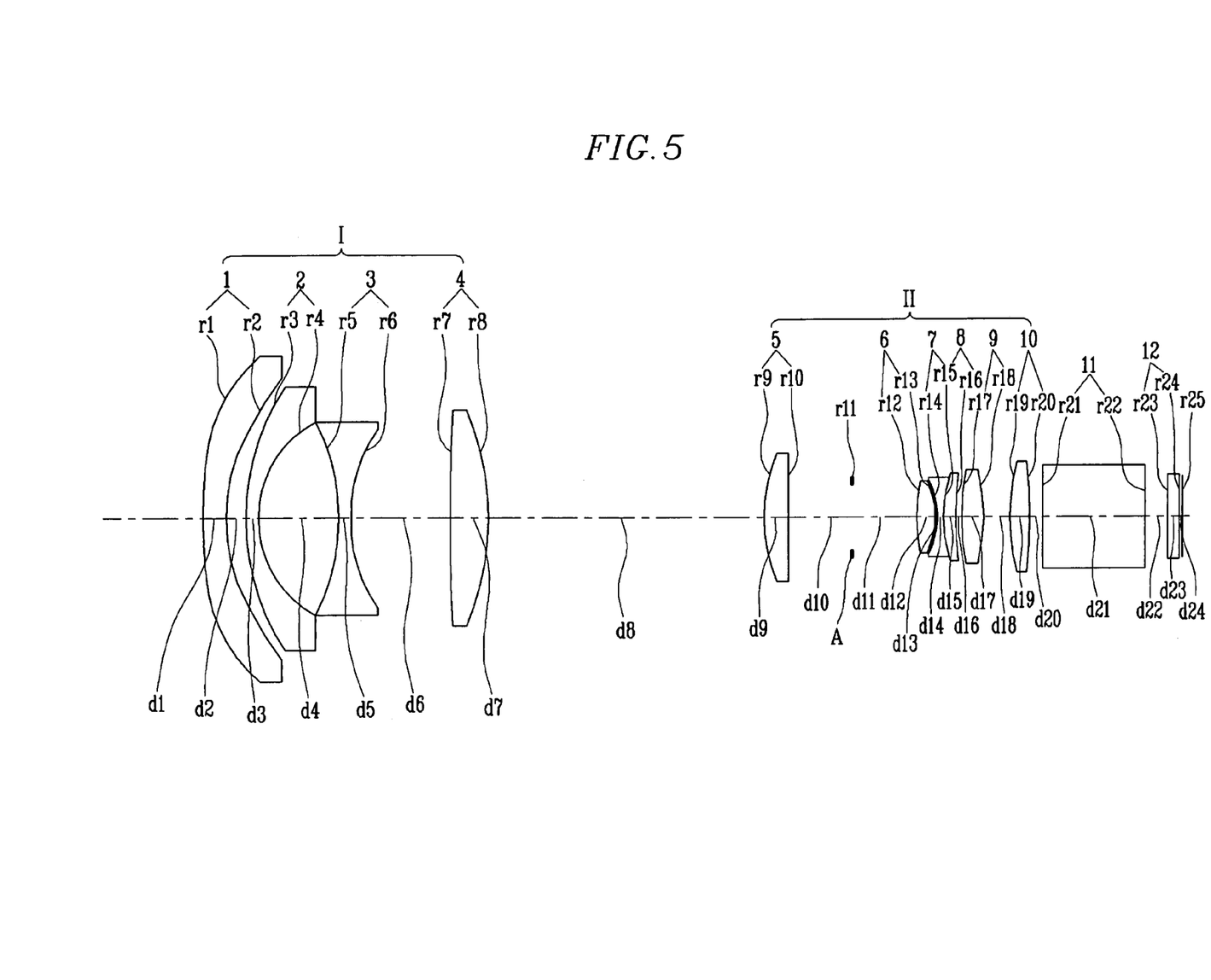
FIG. 5 shows the structure of a wide-angle projection lens according to a third embodiment of the present invention.

FIG. 5 shows the structure of a wide-angle projection lens according to a third embodiment of the present invention. The wide-angle projection lens according to the third embodiment of the present invention has the same structure as the wide-angle projection lens according to the first embodiment, as illustrated in FIG. 5, excepting that the seventh and eighth lenses 7 and 8 are combined together into one cemented lens (i.e., a doublet lens).

Various values associated with the component lenses of the wide-angle projection lens according to the third embodiment of the present invention are presented in Table 5.

TABLE 5

| Face Number | Radius of Curvature (r) | Thickness, Distance (d) | Refractive Index (nd) | Variance (vd) |
|---|---|---|---|---|
| *1 | 179.31157 | 5.500000 | 1.492000 | 57.1000 |
| *2 | 47.98421 | 6.243240 | | |
| 3 | 65.06308 | 3.000000 | 1.516798 | 64.1983 |
| 4 | 28.86925 | 18.377506 | | |
| 5 | −52.75706 | 3.000000 | 1.658436 | 50.8546 |
| 6 | 43.24918 | 21.723358 | | |
| 7 | 389.88262 | 9.510000 | 1.698945 | 30.0506 |
| 8 | −68.39730 | 78.000000 | | |
| 9 | 44.56920 | 5.331807 | 1.670028 | 47.1965 |
| 10 | 388.76642 | 19.852939 | | |
| 11 | ∞ | 9.388635 | | |
| 12 | 59.40819 | 4.758666 | 1.487489 | 70.4412 |
| 13 | −24.08164 | 0.200000 | | |
| 14 | −23.92828 | 1.400000 | 1.755199 | 27.5302 |
| 15 | 25.06260 | 5.100000 | 1.516798 | 64.1983 |
| 16 | 120.48193 | 1.000000 | | |
| 17 | 109.82801 | 5.100000 | 1.487489 | 70.4412 |
| 18 | −59.87139 | 9.507658 | | |
| 19 | 52.08301 | 5.474905 | 1.805181 | 25.4564 |
| 20 | −97.60022 | 3.000000 | | |
| 21 | ∞ | 25.000000 | | |
| 22 | ∞ | 5.300000 | | |
| 23 | ∞ | 2.743200 | | |
| 24 | ∞ | 0.725046 | | |
| 25 | Image side | −0.025037 | | |

The symbol "*" indicates an aspheric surface. The aspheric surface coefficients are presented in Table 6. In the third embodiment, the first lens 1 has an aspheric surface on either side thereof.

TABLE 6

| | Aspheric Surface Coefficients of First Face | Aspheric Surface Coefficients of Second Face |
|---|---|---|
| K | 3.440341 | 0.000000 |
| A | 0.472230E−05 | 0.120326E−05 |
| B | −0.154368E−08 | 0.148442E−08 |
| C | 0.428624E−12 | −0.462754E−11 |
| D | −0.578073E−17 | 0.128341E−14 |

Figure 6:
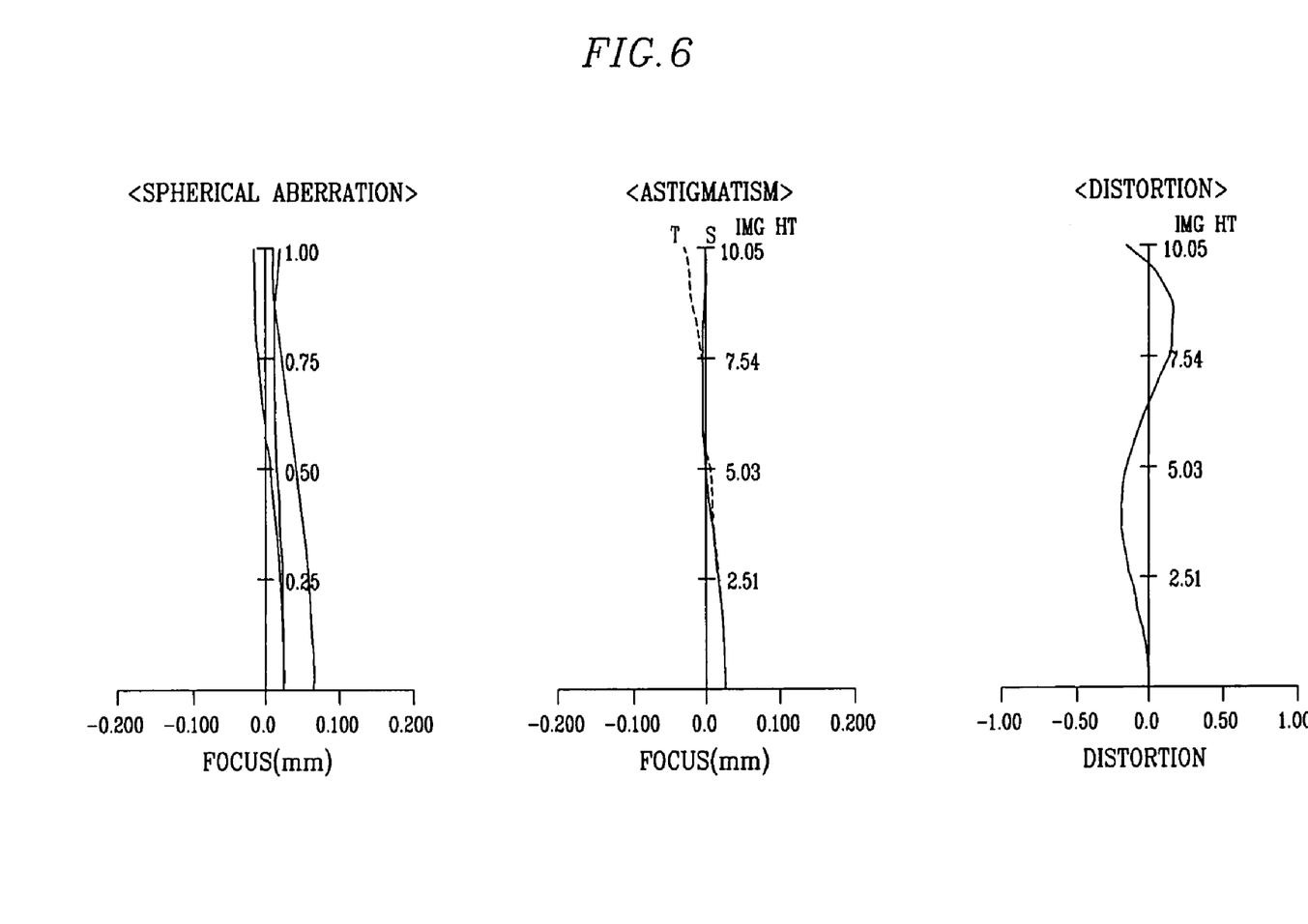
FIG. 6 shows characteristic curves of aberrations of the wide-angle projection lens according to the third embodiment of the present invention.

FIG. 6 shows the characteristic curves of spherical aberration, astigmatism, and distortion of the wide-angle projection lens according to the third embodiment of the present invention.

The wide-angle projection lenses according to the embodiments of the present invention satisfy the above-stated conditions (Conditionals Expressions 1 to 10), and the embodied values for the respective conditional expressions are presented in Table 7.

TABLE 7

| | Embodiment 1 | Embodiment 2 | Embodiment 3 |
|---|---|---|---|
| Conditional Expression 1 | 3.110 | 3.824 | 3.384 |
| Conditional Expression 2 | −1.739 | −1.427 | −1.678 |
| Conditional Expression 3 | 0.978 | 0.828 | 0.996 |
| Conditional Expression 4 | 1.556 | 1.580 | 1.556 |
| Conditional Expression 5 | −4.184 | −4.960 | −4.281 |
| Conditional Expression 6 | 0.326 | 0.150 | 0.294 |
| Conditional Expression 7 | −0.561 | −0.290 | −0.304 |
| Conditional Expression 8 | 0.483 | 0.429 | 0.480 |
| Conditional Expression 9 | −1.186 | −1.005 | −1.162 |
| Conditional Expression 10 | 44.985 | 44.900 | 44.985 |

While this invention has been described in connection with what is presently considered to be the most practical and exemplary embodiment, it is to be understood that the invention is not limited to the disclosed embodiments, but, on the contrary, is intended to cover various modifications and equivalent arrangements included within the spirit and scope of the appended claims. For example, although the above-stated embodiments disclose values for the lenses in the case that the first lens has an aspheric surface on either side thereof, those skilled in the art may also contrive values for the lenses in the case that at least two lenses in the first lens group have an aspheric surface.

As described above, the embodiments of the present invention provide a wide-angle projection lens for projection display that secures a long retrofocal length and a wide angle of view using a simple configuration with facilitated aberration correction and contributes to cost saving and miniaturization of the optical system.

The wide-angle projection lens properly uses aspheric surfaces in the first lens group to reduce the number of large-sized lenses and hence the production cost. The wide-angle projection lens uses cemented lenses properly arranged to secure a wide angle of view above 80 degrees and reduce the thickness of a projection TV or monitor. The wide-angle projection lens has telecentricity available for a large-scaled screen with enhanced luminance ratio. In the case of using lenses coated in correspondence to a reflection panel, the light reflected from the lens surface is just about 0.5% of the incident light, so the reflected light can re-enter the panel to eliminate a ghost.

What is claimed is:

1. A wide-angle projection lens comprising, in order from an object side:
    a first lens group including four lenses and having a negative refractive power; and
    a second lens group including at least one cemented lens and having a positive refractive power,
    the first lens group including at least one aspherical lens and including at least one spherical lens having a positive refractive power,
    the wide-angle projection lens satisfying the following conditional expressions $fb/f>3$, $-2.0<D_{12}/f_1<-1.3$, and $0.8<Lr/Lf<1.2$ wherein f denotes the focal length of the projection lens, fb denotes the retrofocal length of the projection lens, $f_1$ denotes the focal length of the first lens group, $f_2$ denotes the focal length of the second lens group, Lf denotes the thickness of the first lens group, Lr denotes the thickness of the second lens group, and $D_{12}$ denotes the distance between the first and second lens groups.

2. The wide-angle projection lens as claimed in claim 1, wherein the wide-angle projection lens further satisfies the following conditional expression:

$1.5<AV\_Ndf<1.6$ wherein AV_Ndf denotes an averaged refractive index of lenses having a negative refractive power in the first lens group.

3. The wide-angle projection lens as claimed in claim 1, wherein the wide-angle projection lens further satisfies the following conditional expression:

$-5.5<f_1/f<-3.5$.

4. The wide-angle projection lens as claimed in claim 1, wherein the wide-angle projection lens further satisfies the following conditional expressions:

$-0.1<(G_9R_1+G_9R_2)/(G_9R_1-G_9R_2)<0.4$ $-1.0<(G_{10}R_1+G_{10}R_2)/(G_{10}R_1-G_{10}R_2)<-0.25$, and $|L_8/(G_8R_2)|>0.35$ wherein $G_8$ denotes the third lens counted from an image side, $G_9$ denotes the second lens counted from the image side, $G_{10}$ denotes the first lens counted from the image side, $R_1$ denotes the radius of curvature of an object side surface of each lens, $R_2$ denotes the radius of curvature of an image side surface of each lens, and $L_8$ denotes a distance between the image side surface of the third lens counted from the image side and an image plane.

5. The wide-angle projection lens as claimed in claim 1, wherein the wide-angle projection lens further satisfies the following conditional expression:

$-1.3<f_2/f_1<-0.9$.

6. The wide-angle projection lens as claimed in claim 1, wherein the wide-angle projection lens further satisfies the following conditional expression:

$35<Vd_9-Vd_{10}<58$ wherein $Vd_9$ denotes the variance of the second lens counted from the image side, and $Vd_{10}$ denotes the variance of the first lens counted from the image side.

7. The wide-angle projection lens as claimed in claim 1, further comprising:
    a mirror located between the first and second lens groups so as to change a path of a light passing through the first lens group.

8. The wide-angle projection lens as claimed in claim 1, wherein the wide-angle projection lens further includes an iris diaphragm located after the first lens of the second lens group from the object side.

9. The wide-angle projection lens as claimed in claim 1, wherein the first lens group includes, in order from the object side, a first lens having a negative refractive power, a second lens group having a negative refractive power, a third lens having a negative refractive power, and a fourth lens having a positive refractive power.

10. A wide-angle projection lens comprising, in order from an object side:
    a first lens group including four lenses and having a negative refractive power; and
    a second lens group including at least one cemented lens and having a positive refractive power,
    the first lens group including at least one aspherical lens and at least one spherical lens having a positive refractive power,
    the wide-angle projection lens further including an iris diaphragm located after the first lens of the second lens group from the object side,
    the wide-angle projection lens satisfying the following conditional expressions $-0.1<(G_9R_1+G_9R_2)/(G_9R_1-G_9R_2)<0.4$ and $-1.0<(G_{10}R_1+G_{10}R_2)/(G_{10}R_1-G_{10}R_2)<-0.25$ wherein $G_8$ denotes the third lens counted from an image side, $G_9$ denotes the second lens counted from the image side, $G_{10}$ denotes the first lens counted from the image side, $R_1$ denotes the radius of curvature of an object side surface of each lens, and $R_2$ denotes the radius of curvature of an image side surface of each lens.

11. The wide-angle projection lens as claimed in claim 10, wherein the wide-angle projection lens further satisfies the following conditional expression:

$$|L_8/(G_8R_2)|>0.35$$

wherein $L_8$ denotes a distance between the image side surface of the third lens counted from the image side and an image plane.

12. The wide-angle projection lens as claimed in claim 10, wherein the wide-angle projection lens further satisfies the following conditional expression:

$$-1.3<f_2/f_1<-0.9.$$

13. The wide-angle projection lens as claimed in claim 10, wherein the wide-angle projection lens further satisfies the following conditional expression:

$$35<Vd_9-Vd_{10}<58$$

wherein $Vd_9$ denotes the variance of the second lens counted from the image side, and $Vd_{10}$ denotes the variance of the first lens counted from the image side.

14. The wide-angle projection lens as claimed in claim 10, wherein the wide-angle projection lens further satisfies the following conditional expression:

$$fb/f>3,$$

$$-2.0<D_{12}/f_1<-1.3, \text{ and}$$

$$0.8<Lr/Lf<1.2$$

wherein f denotes the focal length of the projection lens, fb denotes the retrofocal length of the projection lens, $f_1$ denotes the focal length of the first lens group, $f_2$ denotes the focal length of the second lens group, Lf denotes the thickness of the first lens group, Lr denotes the thickness of the second lens group, and $D_{12}$ denotes the distance between the first and second lens groups.

15. The wide-angle projection lens as claimed in claim 10, wherein the wide-angle projection lens further satisfies the following conditional expression:

$$1.5<AV\_Ndf<1.6.$$

16. The wide-angle projection lens as claimed in claim 10, wherein the wide-angle projection lens further satisfies the following conditional expression:

$$-5.5<f_1/f<-3.5.$$

17. A wide-angle projection lens comprising, in order from an object side:
a first lens group having a negative refractive power; and
a second lens group having a positive refractive power,
the first lens group including, in order from the object side, a first lens having a negative refractive power, a second lens group having a negative refractive power, a third lens having a negative refractive power, and a fourth lens having a positive refractive power, at least one of the first to fourth lenses being an aspherical lens,
the second lens group including at least one cemented lens,
the wide-angle projection lens further including an iris diaphragm located between the first and second lenses of the second lens group from the object side,
the wide-angle projection lens satisfying the following conditional expressions:

$$-1.3<f_2/f_1<-0.9, \text{ and}$$

$$35<Vd_9-Vd_{10}<58$$

wherein $f_1$ denotes the focal length of the first lens group, $f_2$ denotes the focal length of the second lens group, $Vd_9$ denotes the variance of the second lens counted from the image side, and $Vd_{10}$ denotes the variance of the first lens counted from the image side.

18. The wide-angle projection lens as claimed in claim 17, wherein the wide-angle projection lens further satisfies the following conditional expressions:

$$fb/f>3,$$

$$-2.0<D_{12}/f_1<-1.3,$$

$$0.8<Lr/Lf<1.2,$$

$$1.5<AV\_Ndf<1.6,$$

$$-5.5<f_1/f<-3.5,$$

$$-0.1<(G_9R_1+G_9R_2)/(G_9R_1-G_9R_2)<0.4,$$

$$-1.0<(G_{10}R_1+G_{10}R_2)/(G_{10}R_1-G_{10}R_2)<-0.25, \text{ and}$$

$$|L_8/(G_8R_2)|>0.35,$$

wherein f denotes the focal length of the projection lens, fb denotes the retrofocal length of the projection lens, $f_1$ denotes the focal length of the first lens group, $f_2$ denotes the focal length of the second lens group, Lf denotes the thickness of the first lens group, Lr denotes the thickness of the second lens group, $D_{12}$ denotes the distance between the first and second lens groups, AV_Ndf denotes an averaged refractive index of lenses having a negative refractive power in the first lens group, $G_8$ denotes the third lens counted from an image side, $G_9$ denotes the second lens counted from the image side, $G_{10}$ denotes the first lens counted from the image side, $R_1$ denotes the radius of curvature of an object side surface of each lens, $R_2$ denotes the radius of curvature of an image side surface of each lens, and $L_8$ denotes a distance between the image side surface of the third lens counted from the image side and an image plane, $Vd_9$ denotes the variance of the second lens counted from the image side, and $Vd_{10}$ denotes the variance of the first lens counted from the image side.

\* \* \* \* \*